Oct. 13, 1925.
W. J. ROULEAU
MIXING VALVE
Filed Aug. 22, 1923
1,556,632
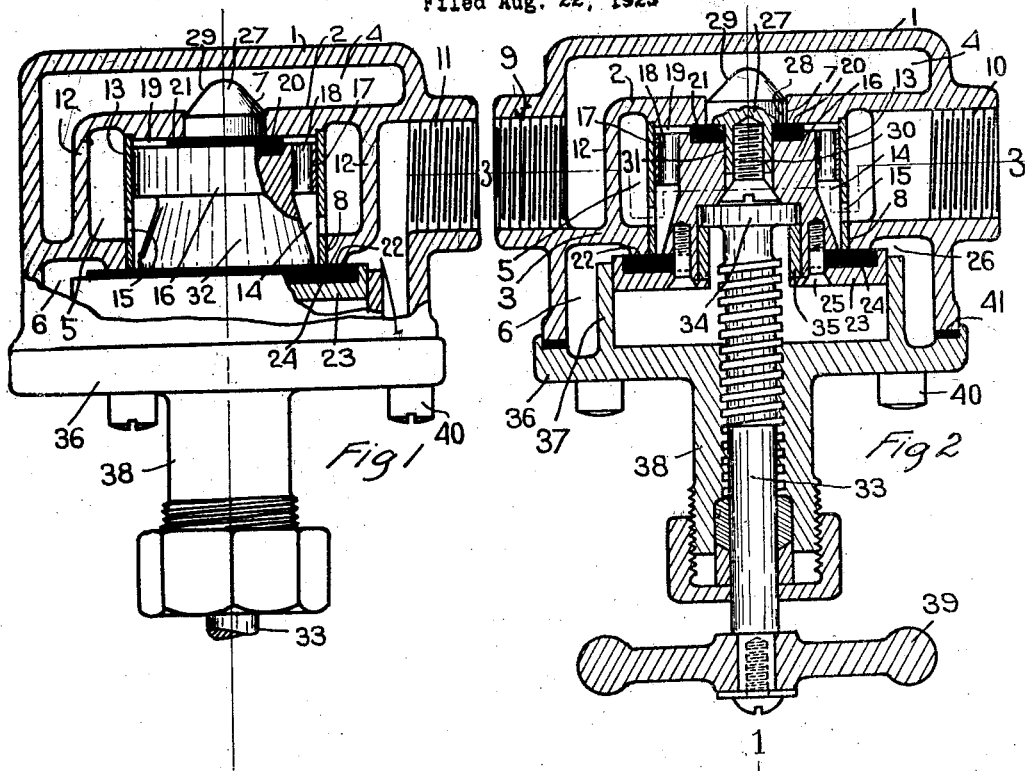
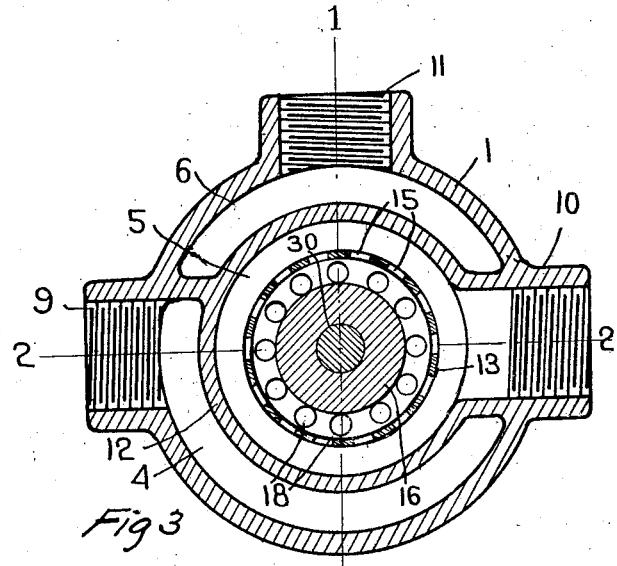
Inventor
Wilfred J. Rouleau
by Heard Smith & Tennant
Attorneys.

Patented Oct. 13, 1925.

1,556,632

UNITED STATES PATENT OFFICE.

WILFRED J. ROULEAU, OF QUINCY, MASSACHUSETTS.

MIXING VALVE.

Application filed August 22, 1923. Serial No. 658,800.

*To all whom it may concern:*

Be it known that I, WILFRED J. ROULEAU, a citizen of the United States, and resident of Quincy, county of Norfolk, State of Massachusetts, have invented an Improvement in Mixing Valves, of which the following description, in connection with the accompanying drawing, is a specification, like characters on the drawing representing like parts.

This invention relates to a mixing valve for mixing hot and cold water and particularly to a valve of the type in which when the valve is first opened only cold water is permitted to flow and as the valve is further opened hot water is gradually admitted until when the valve is fully opened the flow of cold water is stopped and only hot water is permitted to flow.

One of the objects of the invention is to provide a valve of the class described having a novel arrangement of parts such that the valve is of extremely simple structure.

A further object of the invention is to provide a valve of the class described in which the hot and cold water are thoroughly mixed within the valve and all parts of the stream of water emerging from the valve are of equal temperature.

Other objects and features of the invention will more fully appear from the following description and will be particularly pointed out in the claims.

In order to give an understanding of the invention I have illustrated in the drawings a selected embodiment thereof which will now be described after which the novel features will be pointed out in the appended claims.

The drawings illustrate in section a preferred form of construction of the mixing valve and embody the broad principles of the invention.

In the drawings:

Fig. 1 is a section on line 1—1, Fig. 3;
Fig. 2 is a section on line 2—2, Fig. 3;
Fig. 3 is a section on line 3—3, Fig. 2.

As illustrated herein the mixing valve comprises a casing 1 having therein two transverse partitions 2 and 3 which divide the interior of the casing into a hot water chamber 4, a cold water chamber 5, and an outlet chamber 6. The partition 2 is provided with a port 7 and the partition 3 is provided with a port 8 to permit the passage of water therethrough. A threaded opening 9 communicates with the hot water chamber in order that a hot water service pipe, not shown, may convey hot water into the hot water chamber of the valve. Similar openings 10 and 11 communicate with the cold water chamber and outlet chamber respectively so that cold water may be conveyed to the cold water chamber and the mixed water may be conveyed from the outlet chamber to the point at which it is desired for use. The partition 2 is extended at 12 to join the partition 3 in order to form the outside wall of the cold water chamber and divide the cold water chamber from the hot water chamber.

An annular longitudinally extending sleeve 13 surrounds the port 8 in the partition 3 and is of such a size that the walls of the sleeve fit closely against the walls of the port 8 to prevent the leakage of water between the sleeve and the walls of the port. The sleeve extends parallel with the portion 12 of the partition 2 and joins the partition 2 thus forming the inner wall of the cold water chamber. The hollow interior of the sleeve, therefore, forms a chamber 14 which may be termed a mixing chamber and the sleeve is provided at points adjacent the partition with ports 15 by which cold water may pass from the cold water chamber into the mixing chamber. The sleeve joins the partition 2 along one edge which surrounds the port 7 in the partition 2 so that hot water may flow from the hot water chamber through the port 7 to enter the mixing chamber 14 where it is mixed with the cold water which enters the mixing chamber through the ports 15. Thus the annular sleeve forms a mixing chamber within the cold water chamber with its open ends joining the two partitions around the ports 7 and 8 therein and has a plurality of ports through its walls adjacent the outlet chamber which communicate with the cold water chamber. The mixing chamber is in line with the hot water chamber and the outlet chamber, and communicates therewith at either end whereby the hot water flows longitudinally through said mixing chamber but the cold water chamber surrounds the mixing chamber and the cold water is admitted to the mixing chamber from the cold water chamber in a radial direction which is transverse to the flow of hot water.

A valve 16 operates within the sleeve to control the flow of hot water and cold water into the mixing chamber. The valve head has walls 17 which fit tightly against the inner walls of the sleeve to prevent passage of the water between the sleeve and the valve. The valve is provided with ports 18 to permit hot water which enters through the port 7 into the passage 19 above the valve to pass into the mixing chamber which is below the valve. It will thus be seen that in order to enter the mixing chamber the hot water must pass through the port 7, through the passage 19 and then through the ports 18 in the valve from which it emerges into the mixing chamber in a plurality of streams depending upon the number of ports 18 flowing parallel with the wall of the sleeve 13. In order to prevent the flow of hot water through the port 7 a valve seat 20 is formed around the port on that portion of the partition 2 adjacent the valve and a washer 21 is fitted in a recess in the valve for engagement with the valve seat 20 in order to form a tight joint at the valve seat and effectively prevent the flow of water when in engagement with the valve seat.

In order to prevent the passage of water from the mixing chamber a second valve seat 22 is formed on the partition 3 surrounding the port 8 and a flange 23 is formed on the valve for engagement with the valve seat 22. A washer 24 of a suitable size is carried by the flange 23 for engagement with the valve seat 22 for absolutely preventing the passage of water from the mixing chamber when the valve is closed. The flange 23 may be formed integral with the valve but is preferably a separate part and fastened to the valve by means of screws 25. The flange 23 must be so placed on the valve that the washer 24 engages with the valve seat 22 at the same instant that the washer 21 engages with the valve seat 20 Thus when the parts are in the position shown in Figs. 1 and 2 the valve seat 20 and washer 21 prevent the flow of hot water into the mixing chamber and the valve seat 22 and washer 24 prevent the flow of cold water, which fills the mixing chamber through the ports 15, from the mixing chamber into the outlet chamber.

When the valve is first opened the flange 23 and washer 24 move away from the valve seat 22 and permit cold water to pass from the mixing chamber around the valve seat 22 and into the outlet chamber by means of the passage 26. When the valve is thus opened the washer 21 moves away from the valve seat 20 and hot water would be permitted to pass from the hot water chamber into the mixing chamber, but to prevent this a plug 27 is fastened to the valve and closes the port 7 in the partition 2. This plug has walls 28 which closely engage the walls of the port 7 and prevent the passage of an appreciable amount of hot water from the chamber 4 into the passage 19 until the plug is withdrawn from the port 7. The end of the plug is of conical shape, having sloping walls 29, so that when the walls 28 of the plug are withdrawn from engagement with the walls of the port 7 hot water is permitted to pass through the port in amounts depending upon the size of the opening between the walls 29 of the end of the plug and the walls of the port 7. Thus when the valve is opened slightly cold water is permitted to pass into the outlet chamber as hereinbefore described but the passage of hot water is prevented until the valve is moved far enough for the walls 28 of the plug to become disengaged from the walls of the port 7 and the passage of hot water is permitted in increasing amounts the further the valve is withdrawn.

The plug is retained on the valve by means of a screw 30, the head of which engages with the valve and the threaded end of which screws into the plug. The plug may be provided with a stem 31 and the valve may be provided with an opening extending therethrough to receive the stem of the valve and permit the passage of the threaded end of the screw into the threaded opening in the stem of the plug but retain the head of the screw against the walls of the opening. The plug may also be used as a means to retain the washer 21 in position on the valve and to this end the stem of the plug is made of such a size that a shoulder is formed thereon for engagement with the washer.

In order to decrease and finally stop the flow of cold water into the mixing chamber, the valve is withdrawn so that the walls 17 thereof gradually pass over the ports 15 in the sleeve thus gradually closing the ports 15 and gradually stopping the flow of cold water from the cold water chamber into the mixing chamber. It is readily seen that when the walls 17 are gradually closing the ports 15 to prevent the flow of cold water, the conical end of the plug 27 is being withdrawn from the port 7 to permit the increased flow of hot water from the hot water chamber into the mixing chamber through the passage 19 and ports 18, and also that when the ports 15 are entirely closed the port 7 is fully open with the result that only hot water is passing through the mixing chamber. By adjusting the position of the valve, varying relative amounts of hot and cold water are permitted to pass into the mixing chamber so that the valve in one position only cold water passes from the outlet chamber and in another position only hot water passes from the outlet chamber while in any intermediate positions, mixed water with varying amounts of hot and cold water is permitted to pass.

In order to thoroughly mix the hot and cold water when they pass into the mixing chamber, the valve has a portion 32 opposite the ports 15 lying at an angle to the flow of cold water. This portion is preferably placed as shown in the drawings so that when the cold water moves against it the cold water is directed against the flow of hot water to secure a very thorough mixing of the hot and cold water. Thus the hot water flowing through the ports 18 in the valve and impinging upon the surface 32 is thrown outwardly toward the ports 15 while the cold water entering through the ports 15 has movement transverse of the flow of hot water and, due to the action of the surface 32, also has movement against the flow of hot water. A very thorough mixing of the hot and cold water is thus accomplished.

The valve is moved by means of a rod 33 having a flanged head 34 thereon which is rotatably retained within the valve. In order to retain the head within the valve, a sleeve 35 may conveniently be placed against the edges of the head and retained in position by means of the end of the sleeve engaging with the inner edge of the flange 23. The casing is inclosed by a cover-plate 36 having guide flanges 37 thereon which guide the valve by engagement with the outer edge of the flange 23 of the valve and also form the inner wall of the outlet chamber 6. The plate is made with an apertured projection 38 through which the rod 33 passes. The aperture is preferably threaded to engage with threads cut on the rods so that by rotation of the rod the valve may be moved. The usual cap, packing and packing washer are provided for use in conjunction with the device. A suitable handle 39 may be placed on the end of the rod and retained thereon by a screw. The cover plate may be retained on the casing by means of screws 40 and a packing 41 is placed between the cover and the casing to prevent leakage of water.

The parts of the mixing valve may be made of any suitable material and of any size but they preferably have the relative proportions shown by the drawings. The valve is of general application for use in the mixing of two fluids and although the terms "hot water" and "cold water" and "hot water chamber" and "cold water chamber" have been used throughout the specification and claims, these terms are to be regarded as illustrative only to denote two different fluids which it may be desirable to thoroughly mix.

Although a particular and preferred form of the invention has been described, modifications may be made and the invention is to be construed as broadly as the limitations in the claims, taken in conjunction with the prior art, may allow.

Having thus described the invention, what is claimed as new and desired to be secured by Letters Patent is:

1. A mixing valve comprising a casing, two transverse ported partitions dividing the interior of the casing into hot water, cold water, and outlet chambers, an annular longitudinally extending ported sleeve stationarily mounted within the cold water chamber with its ends joining the two partitions, said sleeve forming within it a mixing chamber communicating with the hot water, cold water, and outlet openings, and a valve having a portion within the sleeve for controlling the flow of hot water and a portion exterior to the sleeve to control cold water into the mixing chamber and the flow of water from the mixing chamber.

2. A mixing valve comprising a casing, two transverse ported partitions dividing the interior of the casing into hot water and outlet chambers on either side of the partitions and a cold water chamber between the partitions, an annular longitudinally extending sleeve stationarily mounted within the cold water chamber forming within it a mixing chamber, the open ends of the sleeve joining the two partitions around the ports therein and said sleeve having a plurality of ports through its walls adjacent the outlet chamber and communicating with the cold water chamber, a valve having a portion within the sleeve provided with ports therein to permit the passage of hot water from the hot water chamber to the mixing chamber, said valve controlling the flow of hot water and cold water into the mixing chamber and the flow of water from the mixing chamber.

3. A mixing valve comprising a casing having two transverse partitions dividing the interior thereof into three chambers, one end chamber constituting a hot water chamber, the other end chamber constituting an outlet chamber and the intermediate chamber constituting a cold water chamber, a stationarily mounted cylindrical wall extending between said partitions and situated within the cold water chamber, the space within said cylindrical wall constituting a mixing chamber, there being a port in each partition communicating with the mixing chamber and ports in said wall providing communication between the cold water chamber and the mixing chamber, and a valve device having a portion operating within the stationary cylindrical wall for controlling the flow of both hot water and cold water into the mixing chamber and also having a portion exterior to said cylindrical wall for controlling the flow of water from the mixing chamber.

4. A mixing valve comprising a casing, two transverse ported partitions dividing the interior of the casing into hot water, cold water and outlet chambers, an annular longitudinally extending ported sleeve stationarily situated within the cold water chamber forming within it a mixing chamber in line with the hot water chamber, which mixing chamber communicates at one end with the hot water and at the other end with the outlet chamber, and a valve having a portion within the sleeve for controlling the flow of hot water and cold water into the mixing chamber and a portion exterior to the sleeve to control the flow of water from the mixing chamber, whereby the hot water flows longitudinally through the mixing chamber and the cold water flows into the mixing chamber transversely of the flow of hot water thereby obtaining a thorough mixing.

5. A mixing valve of the type recited in claim 4 in which the valve has a portion opposite the ports through which the cold water enters the mixing chamber lying at an angle to the flow of the cold water to assist in mixing the cold water with the hot water.

6. A mixing valve comprising a casing, two transverse ported partitions dividing the interior of the casing into hot water, cold water and outlet chambers, an annular longitudinally extending ported sleeve within the cold water chamber forming a mixing chamber, a valve having a valve head within the sleeve for controlling the flow of hot water and cold water into the mixing chamber, said valve head fitting tightly against the inner walls of the sleeve to guide the valve, a guide flange carried by the casing, and a flange carried by the valve for controlling the flow of water from the mixing chamber and engaging the guide flange to guide the valve.

7. A mixing valve comprising a casing having two transverse partitions dividing it into three chambers, the central one of which constitutes a cold water chamber and one of the others constituting a hot water chamber and the other an outlet chamber, a stationary cylindrical wall within the cold water chamber forming within it a mixing chamber, there being ports through said partitions into the mixing chamber and ports through said wall, and a valve device having two portions which control the ports in the partitions and also having a piston portion controlling the ports in the cylindrical wall, said piston portion having ports therethrough.

8. A mixing valve comprising a casing provided with partitions which divide the casing into a hot water chamber, a cold water chamber, a mixing chamber and an outlet chamber, the cold water chamber and the mixing chamber being concentric with the cold water chamber entirely surrounding the mixing chamber, the partition between the cold water chamber and mixing chamber being provided with ports so distributed that cold water enters the mixing chamber from all sides, said partitions providing a port from the hot water chamber which leads into the end of the mixing chamber and also providing a port between the mixing chamber and the outlet chamber, and a valve device having a portion controlling the flow from the hot water chamber into the mixing chamber, another portion controlling the flow from the cold water chamber into the mixing chamber, and a third portion controlling the flow from the mixing chamber to the outlet chamber.

In testimony whereof, I have signed my name to this specification.

WILFRED J. ROULEAU.

Certificate of Correction.

It is hereby certified that in Letters Patent No. 1,556,632, granted October 13, 1925, upon the application of Wilfred J. Rouleau, of Quincy, Massachusetts, for an improvement in "Mixing Valves," an error appears in the printed specification requiring correction as follows: Page 3, line 81, claim 1, strike out the words " a portion exterior to the sleeve to control " and insert the same to follow after the word " and," line 82, in same claim; and that the said Letters Patent should be read with this correction therein that the same may conform to the record of the case in the Patent Office.

Signed and sealed this 10th day of November, A. D. 1925.

[SEAL.]
WM. A. KINNAN,
*Acting Commissioner of Patents.*